United States Patent [19]

Takenaka et al.

[11] 4,225,890
[45] Sep. 30, 1980

[54] MAGNETIC TAPE RECORDER HAVING A TAPE DRIVE CONTROLLER IMPLEMENTED WITH A DIGITAL PROCESSOR CHIP

[75] Inventors: Takashi Takenaka, Higashihiroshima; Masaaki Maegawa, Tsuzuki; Tosaku Nakanishi, Higashihiroshima, all of Japan

[73] Assignee: Sharp Kabushiki Kaisha, Osaka, Japan

[21] Appl. No.: 935,329

[22] Filed: Aug. 21, 1978

[30] Foreign Application Priority Data

Aug. 26, 1977 [JP] Japan .............................. 52-103081
Aug. 26, 1977 [JP] Japan .............................. 52-103082
Aug. 26, 1977 [JP] Japan .............................. 52-103083
Aug. 26, 1977 [JP] Japan .............................. 52-103084
Aug. 26, 1977 [JP] Japan .............................. 52-103087

[51] Int. Cl.² .................... G11B 15/18; G11B 19/00
[52] U.S. Cl. .................................. 360/72.1; 360/71; 179/100.1 PS
[58] Field of Search .................. 360/72, 71, 73-74, 360/105; 179/100.1 VC, 100.1 PS, 100.1 TC

[56] References Cited

U.S. PATENT DOCUMENTS

| | | | |
|---|---|---|---|
| 3,809,302 | 5/1974 | Malyon | 360/72 X |
| 3,984,869 | 10/1976 | Fujii et al. | 179/100.1 UC X |
| 4,000,518 | 12/1976 | Stearns | 179/100.1 PS X |
| 4,014,039 | 3/1977 | Yasunaga | 179/100.1 VC X |
| 4,066,349 | 1/1978 | Flint | 360/72 X |

*Primary Examiner*—John H. Wolff
*Attorney, Agent, or Firm*—Birch, Stewart, Kolasch & Birch

[57] ABSTRACT

A magnetic tape recorder is disclosed which comprises a tape counter means for counting revolutions of a tape reel, a memory means for storing preselectable position information of a specific position on a tape, introduced via a keyboard means, and a decision logic means for determining if the output of the tape counter means and the output of the memory means agree. The operational state of the tape recorder is controlled in response to the output of the decision logic means so that record and play modes can be started or stopped with any preselectable position on the tape. Such capabilities are implemented with a digital processor semiconductor chip which normally includes a non-destructive memory program storage. In one preferred form, timepiece and/or timer functions are combined operatively with the tape counter means.

16 Claims, 14 Drawing Figures

|   | PLAY | PAUSE | WIND | REW | drive state | PLAY lever | PAUSE lever | WIND lever | REW lever |
|---|---|---|---|---|---|---|---|---|---|
| 1 | 0 | 0 | 0 | 0 | stop | ↑ | ↑ | ↑ | ↑ |
| 2 | 1 | 0 | 0 | 0 | play | ↓ | ↑ | ↑ | ↑ |
| 3 | 0 | 1 | 0 | 0 | stop | ↑ | ↓ | ↑ | ↑ |
| 4 | 1 | 1 | 0 | 0 | pause | ↓ | ↓ | ↑ | ↑ |
| 5 | 0 | 0 | 1 | 0 | fast forward | ↑ | ↑ | ↓ | ↑ |
| 6 | 1 | 0 | 1 | 0 | ff/play | ↓ | ↑ | ↓ | ↑ |
| 7 | 0 | 1 | 1 | 0 | ff | ↑ | ↓ | ↓ | ↑ |
| 8 | 1 | 1 | 1 | 0 | ff/pause | ↓ | ↓ | ↓ | ↑ |
| 9 | 0 | 0 | 1 | 1 | rewind | ↑ | ↑ | ↑ | ↓ |
| 10 | 1 | 0 | 1 | 1 | rewind/play | ↓ | ↑ | ↑ | ↓ |
| 11 | 0 | 1 | 1 | 1 | rewind | ↑ | ↓ | ↑ | ↓ |
| 12 | 1 | 1 | 1 | 1 | rewind/play | ↓ | ↓ | ↑ | ↓ |

*FIG. 13*

|   | S2 | S1 | drive state |
|---|---|---|---|
| 1 | 0 | 0 | — |
| 2 | 0 | 1 | OFF |
| 3 | 1 | 0 | ON |
| 4 | 1 | 1 | AUTO |

*FIG. 14*

MAGNETIC TAPE RECORDER HAVING A TAPE DRIVE CONTROLLER IMPLEMENTED WITH A DIGITAL PROCESSOR CHIP

BACKGROUND OF THE INVENTION

The present invention relates to a magnetic tape recorder and more particularly to an improved tape counter means utilizing a digital data processor chip for use in a magnetic tape recorder, for example, a cassette tape deck.

There are two basic types of a tape counter means having memory capabilities: the mechanical type and the electronic type. The former includes two mechanical tape counters one indicating the actual number of tape revolutions or the instantaneous tape position and the other indicating a desired position or tape count preselected by manual operation. There is provided a switch means which is enabled to place a tape drive mechanism into a desired operational state only when both agree. The latter, on the other hand, includes a running tape counter means of the electronic type, and a preselectable tape counter means of the mechanical type where a desired tape count is preselectable by manual dial operation.

However, durability and reliability of the former are not so good because of the mechanical type of both the tape counter means. Preset operation is also a little too bothersome. Even for the latter, the above described issues are still outstanding because one of the tape counter means is of the mechanical type.

SUMMARY OF THE INVENTION

Accordingly, it is an object of the present invention to provide a tape counter means for use in a magnetic tape recorder or the like which avoids the prior art problems.

To achieve the above noted objective, according to the present invention, a running tape counter and a preselectable tape counter are both electronically designed and preferably implemented with a digital processor semiconductor chip.

In its broadest aspect, a tape recorder apparatus of the present invention comprises a running tape counter means for counting revolutions of a tape reel or an instantaneous position of a tape, a memory means for storing preselectable position information representative of a desired position on the tape, and a decision logic means for determining if the output of the tape counter means and the output of the memory means agree, the output of the decision logic means being available to shift the operational state of the tape recorder apparatus. It is preferable that the preselectable position information be introduced via a keyboard means having a plurality of digit keys.

In one preferred aspect of the present invention, the count of the running tape counter means is modified optionally via the keyboard means whenever the operator wants, serving his convenience of handing the tape. If any desired count is established within the running tape counter means, it becomes unnecessary to rewind the tape completely to its initial position and increment the tape counter correspondingly.

In another preferred aspect of the present invention, upon depression of a specific key (namely, a direct memory key), the contents of the running tape counter means are transferred and stored into a different memory and an output useful to shift the operational state of the tape apparatus is developed when there is again agreement with the thus stored tape count. Such feature of the present invention is very important and useful, for example, when the tape apparatus is in the play state and then shifted into the fast forward state or the rewind state for any reason and thereafter the operator desires to listen again to the preceding music program beginning with the previous play position, or when a given program is recorded beginning with any intermediate position on a tape and immediately he desires to reproduce such recorded program beginning with the intermediate tape position. In contrast, in the prior art apparatus the running tape counter means must be reset to zero in such instance, causing a possibility of a deviation of the tape count from the actual tape position.

It is well known to measure the running distance of the tape in terms of time (namely, a time counter). The tape apparatus of the present invention includes a time counter for measuring the period of time where a tape has been running. The time counter is enabled when the tape apparatus is in the constant speed tape drive state (record and play) and disabled otherwise.

BRIEF DESCRIPTION OF THE DRAWINGS

Other objects and many of the attendant advantages of the present invention will be readily appreciated as the same becomes better understood by reference to the following detailed description which considered in conjunction with the accompanying drawings in which like reference numerals designate like parts throughout the figures thereof, and wherein:

FIG. 13 is a code table correlated between respective operational switches and drive states; and FIG. 14 is a code table with respect to OFF/ON/AUTO states of a power switch.

DETAILED DESCRIPTION OF THE INVENTION

Figure 1:
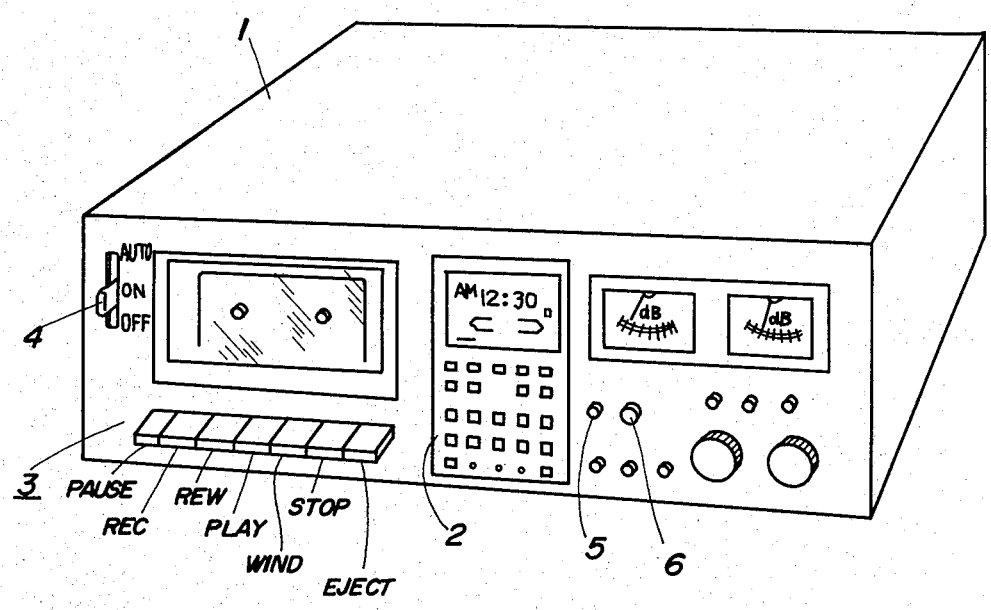
FIG. 1 is a perspective view of a cassette deck embodying the present invention.

FIG. 1 shows a perspective view of a cassette tape deck apparatus embodying the present invention, which is split into a deck body 1 and a control unit 2. The deck body 1 includes a power supply, a tape drive mechanism, etc., whereas the control unit 2 includes timepiece functions capable of setting time and selecting either the 12-hour period or the 24-hour period via depression of ten digit keys and timer functions capable of enabling and disabling the tape drive mechanism at any desired time and turning on and off house current through an AC plug socket at any desired time in addition to the major features of the present invention briefly described above.

Operatively associated with the control unit 2 are a power switch 4 having three selectable modes OFF-/ON/AUTO, a memory rewind switch 5, a noise reduction switch 6 and respective operational lever switches 3 reading PAUSE, RECORD, REWIND, PLAY, WIND, STOP AND EJECT. When manually operated down, these mode switches are latched to establish desired modes of operation. All other components in the cassette deck apparatus are well known the disclosure of which is omitted because they are immaterial to the present invention.

Figure 2:
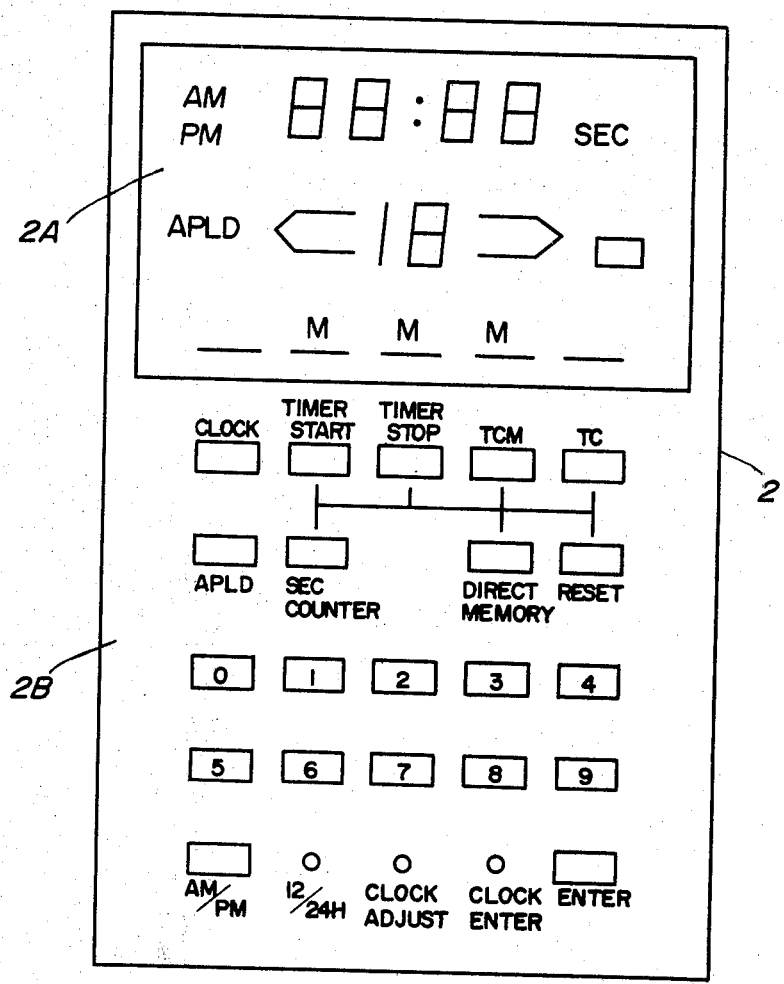
FIG. 2 is a front view of an operational panel having a display and respective keys.

FIG. 2 represents a front view of the controller unit 2 which is divided into display panel regions 2A (preferably, a liquid crystal display LCD) and a key operational panel region 2B. A display pattern and a key layout will be described below together with respective display and key functions. While all segments are depicted in the drawings, only segments necessary to indicate different ones of the operational modes are in fact enabled.

The display panel region 2A contains the timepiece functions, the timer functions, indicators AM, PM,

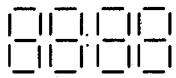

for displaying the contents of a tape counter memory and a tape counter, a second indicator SEC for displaying the period of time where the tape is running, and APLD indicator for displaying a program-to-program silence, a tape running direction indicator

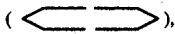

a program number indicator

operatively associated with the APLD function, a memory load indicator M and a display indicator —.

The keyboard 2B, on the other hand, comprises the following keys:

(1) display selection keys

They are provided for selection of six display modes CLOCK, TIMER START, TIMER STOP, TCM, TC and SECOND COUNTER. Upon depression of a specified key, a different one of the display modes is established and displayed on the corresponding indicator.

(2) an APLD read-in key

This is used to introduce the identifying number of a desired program (for example, a music piece) during the APLD mode (where a program-to-program silence is detected whenever this occurs and the number of programs recorded is counted by counting the number of such detection signals whereby precise heading of the desired program is attained without difficulties). The function and circuit construction are fully disclosed and illustrated in U.S. Pat. No. 4,014,039 AUTOMATIC PROGRAM LOCATOR FOR TAPE DECKS Mar. 22, 1977 owned by same assignee of this application, the disclosure of which is incorporated by reference herein.

(3) a RESET key

This key when depressed resets a timer and a timer count memory TCM during the display mode.

(4) a DIRECT MEMORY key

During the display modes of TC and TCM the count of the tape counter TC is transferred into the tape counter memory TCM upon depression of the DIRECT MEMORY key, loading the memory.

(5) digit keys and an AM/PM key

These keys serve the purpose of introducing time information and numerical information into the deck apparatus during the respective display modes.

(6) an ENTER key

This key serves to terminate the read-in mode and place the memories into the ready state before the respective modes associated with the memories are initiated (except for CLOCK).

(7) a CLOCK ENTER key

A read-in terminate key exclusive for the clock mode.

(8) a CLOCK ADJUST key

A time correction key.

(9) a 12/24 H key

This selects the 12 hour period or the 24 hour period optionally.

Figure 3:
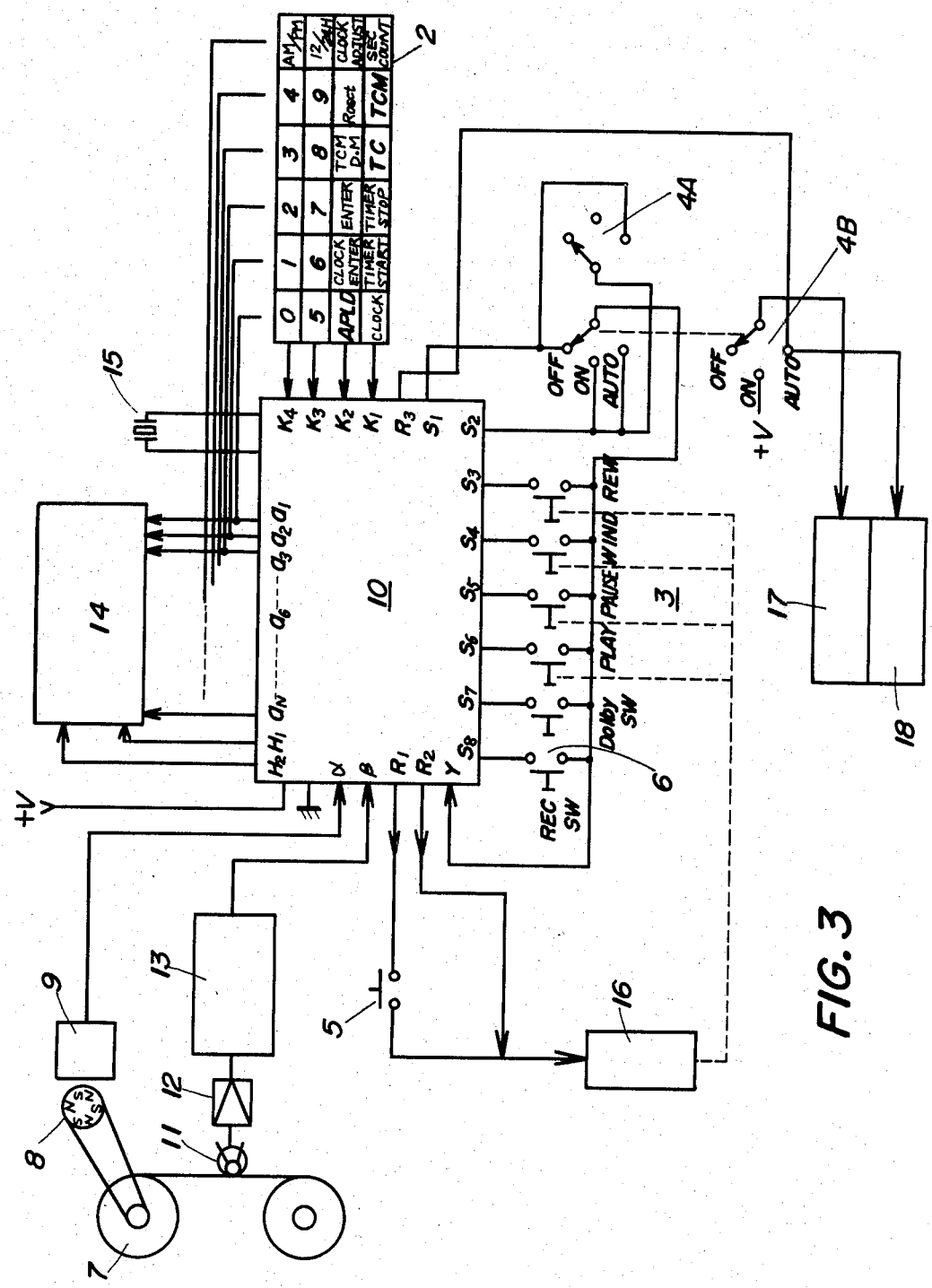
FIG. 3 is a system block diagram of one preferred form of the present invention.

A system block diagram of one preferred form of the present invention is shown in FIG. 3 wherein a key matrix corresponds to the keyboard panel 2B of FIG. 2. A one-chip, LSI digital microprocessor 10 provides backplate signals $H_1$, $H_2$ and segment signals $a_1$ to $A_N$ for a digital display 14, some of these segment signals $a_1$ to $a_6$ being used as key strobe signals. Key input terminals $K_1$ to $K_6$ receive signals from the key matrix 2 to form a 4 by 6 key matrix together with the key strobe signals.

All controls for the tape deck apparatus are provided by the one-chip microprocessor. Master clock pulses are developed from a quartz 15 connected externally to the microprocessor, providing a time standard for all horological operations.

An input $\alpha$ is derived from a detector circuit 9 whereby revolutions of a reel 7 carrying the cassette tape thereon are sensed in terms of variations in the magnetic properties of a Hall effect element or the like to develop digital electric signals correspondingly. The output of the detector circuit 9 is applied as a tape count pulse to an $\alpha$ input terminal.

A program-to-program silence is sensed by magnetic head assembly 11 and then amplified so that a program-to-program silence detection signal is provided from a silence output circuit 13 and sent to a $\beta$ input terminal. Strobe signals $S_1$ and $S_8$ detect the input state of the deck apparatus in cooperation with drive mechanism state representations (see FIG. 13) applied to a $\gamma$ input terminal. The REC switch is latched when it is desired to enable the record mode. When the REC switch is in the on state, the microprocessor 10 decides that the deck apparatus is in the record mode and controls not to modify the operational state of the drive mechanism. The power switch 4 is in the form of three-circuit and three-contact to take any of the three operational states OFF, ON and AUTO in accordance with combinations of connections to the two strobe signal output terminals $S_1$ and $S_2$. FIG. 14 illustrates a code table of code notations associated with the ON, OFF and AUTO states. In this instance, the power switch 4 controls power supplied 17 and 18 from the deck body and the AC plug socket but has nothing to do with a power supply to the microprocessor 10. In FIG. 13, there are shown twelve possible operational states of the drive mechanism according to various combinations of the playback, pause, fast forward and rewind modes.

A memory rewind signal is developed at an output terminal $R_1$ when a tape counter within the microprocessor 10 reaches from 0001 to 0000 (in about 100 ms). The memory rewind switch 5 exists on the way of the memory rewind signal so that the switch 5 on the operational panel can determine whether this signal energizes a plunger 16 or whether the memory rewind mode is to be executed.

The plunger 16 is operatively associated with the operational mode selection switches PLAY, WIND, etc. Assume now that the rewind switch is latched down and thereby the deck body is in the rewind mode. Under the circumstance the counter is allowed to be decremented and, when the counter reaches 0001→0000, the signal is developed at the $R_1$ output terminal, energizing the plunger 16 and unlocking the drive mechanism. In other words, the REW switch is raised upward to place the WIND/REWIND switch into the off state and the deck apparatus into the stop mode. The tape stops running.

Like $R_1$, a pulse signal $R_2$ of about 100 ms long is useful to energize the plunger 16 and unlock the drive mechanism. The pulse signal is developed from $R_2$ under the following conditions:

(1) the pulse is developed to release the drive mechanism within a period of about 3 seconds of completely rewinding of the tape (the so-called "autostop").

(2) the pulse is developed and the drive mechanism is unlocked when the program-to-program silence detection signals are counted and the counter reaches 0000, (3) a desired tape count position is loaded into the tape counter memory TCM in advance and, if the value of the tape counter is in agreement with the value of the tape count memory, the above described pulse signal is developed to unlock the drive mechanism, and (4) when the drive mechanism is in the play mode and the power switch 4 of the deck apparatus is turned off, the head is always kept in close contact with the tape with accompanying adverse effects on both the tape and the head. The pulse is developed to avoid this problem (the so-called mechanical control function).

While the power switch 4 of the deck apparatus is in the auto mode, an output $R_3$ serves as a timer signal in controlling the deck power supply 17 and the AC plug socket ON/OFF switch 18.

Figure 4:
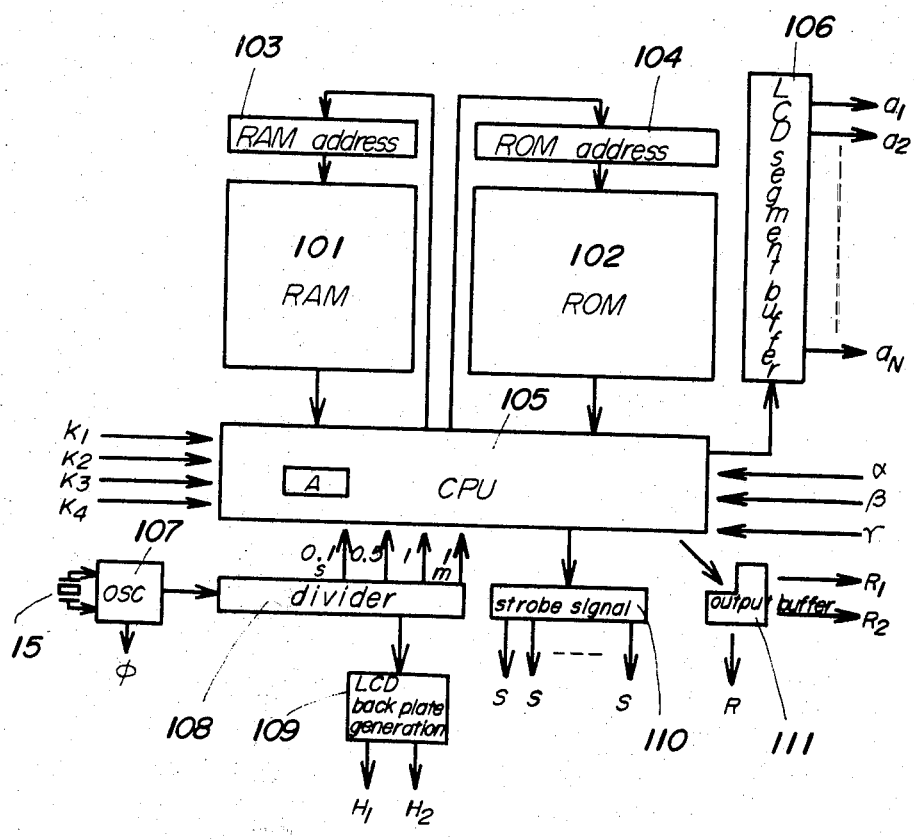
FIG. 4 is a block diagram of a one-chip, micro digital processor for executing a system control for the cassette deck.

FIG. 4 is a block diagram of the one-chip microprocessor for providing controls for the deck apparatus, which comprises an oscillator 107 responsive to the quartz 15, a frequency divider 108 providing time signals in the order of 0.1 seconds, 0.5 seconds, 1 second and 1 minute, an output buffer 111 for providing the key input signals $K_1$ to $K_4$, the discrete inputs $\alpha$, $\beta$ and $\gamma$ and the discrete outputs $R_1$, $R_2$ and $R_3$, a generator 110 for providing the strobe signals $S_1$ to $S_8$ useful to moniter the operational state of the drive mechanism, a generator 109 for providing the backplate signals $H_1$ and $H_2$ for the LCD display, a generator 106 for providing the respective segment signals for the LCD display, a central processing unit CPU 105 for controlling the above mentioned components, a read only memory ROM and a random access memory RAM.

Figure 5:
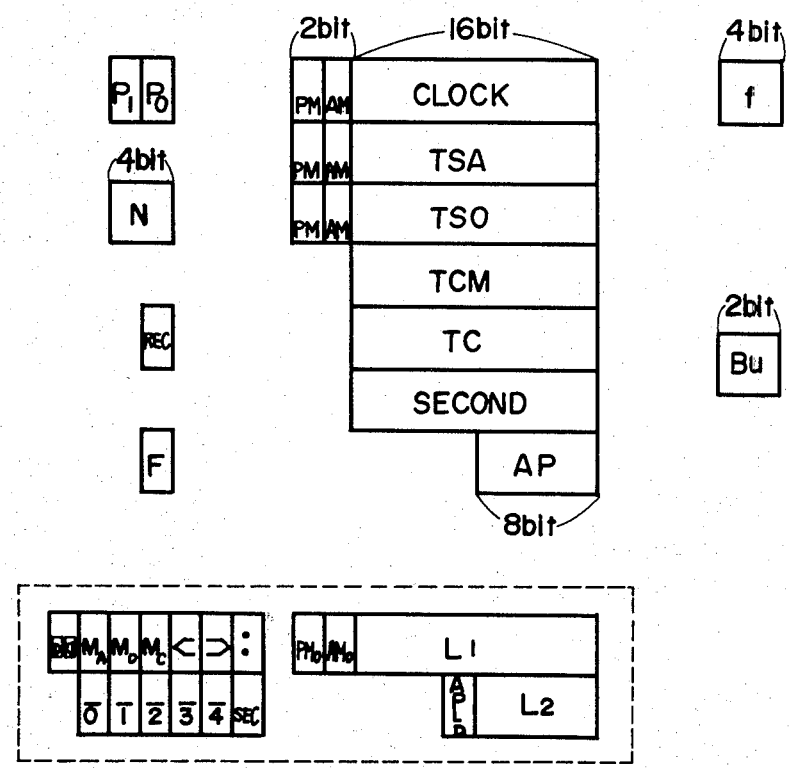
FIG. 5 is a family of registers contained within a random access memory (RAM) of the digital processor of FIG. 4.
Figure 6:
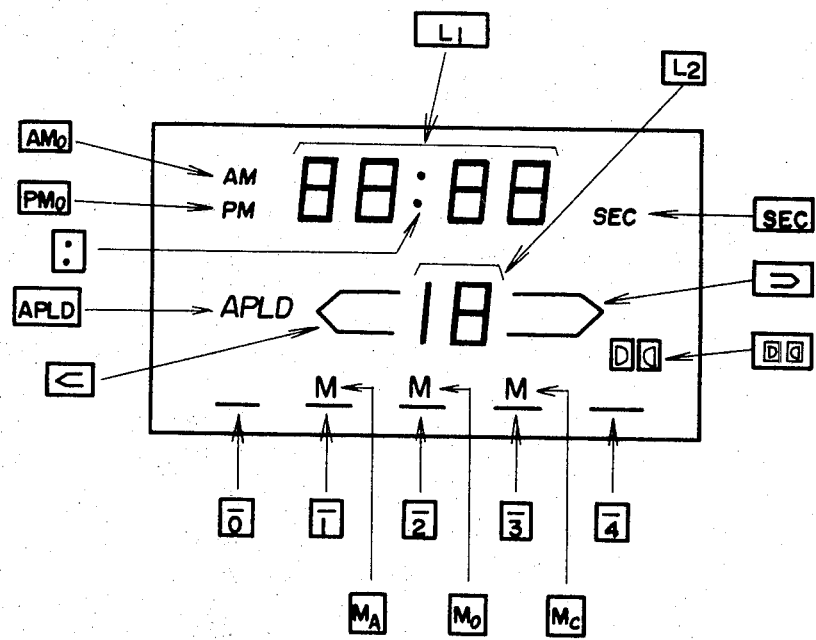
FIG. 6 is a diagram illustrating the relationship between display segments and display buffer registers.

A family of registers contained within the RAM of FIG. 4 are shown in FIG. 5. A CLOCK resister is a timekeeping register which performs the sexagesimal operation in response to the 1 minute signal from the divider 108. A TSA register stores a timer start point and a TSO register timer stop point. Those registers CLOCK, TSA, TSO are provided with additional two bits PM and AM, enabling an AM/PM distinction in the case of the 12 hour period. A TCM register stores the tape counter position information while a tape counter TC is incremented each time the input or comes. A second counter register SECOND performs the sexagesimal operation in response to the 1 second signal from the divider 108. It will be noted that the SECOND register is made operable for accumulating the period only when the drive mechanism is in the play mode (so far as the REC switch is operated, the record period is accumulated). An AP register is needed for the APLD feature and particularly decremented during the APLD operation each time the $\beta$ input pulse comes.

A family of display buffer registers encircled with the broken line correspond respectively to the individual display segments, wherein $L_1$ and $L_2$ are numerical display registers and the remaining registers are associated with flip flops representative of the respective display modes. The contents of the respective one of the registers to be displayed are selected and transferred into $L_1$ or $L_2$. It will be appreciated that the $L_2$ register is associated only with the AP register. A four-bit register f decides what register to be displayed. f=0, 1, 2, 3, 4, 5 correspond to the respective display segments 0, 1, 2, 3, 4, SEC. In other words, any one of the display segments 0, 1, 2, 3, 4, SEC is energized and the contents of its associated register are called for and displayed on $L_1$. $P_0$ and $P_1$ store the operational mode of the deck power switch, namely, OFF codes 01, ON codes 10 and AUTO codes 11 shown in FIG. 14.

Also, N stores the four input states PLAY/PAUSE/WIND/REW of FIG. 13. CPU within the microprocessor detects the on and off states utilizing the strobe signals $S_1$ to $S_8$ with the results thereof loaded into the registers $P_1$, $P_0$ and N. CPU decides the internal state of the drive mechanism by monitering the contents of the registers $P_1$, $P_0$ and N. These registers are called for on the display upon depression of the mode keys and depression of the digit keys permits numerical information to be introduced thereinto. The following will make the operational modes of the deck apparatus briefly described more clear.

(1) preparation

When a new and good battery is installed for exchange, all the registers are cleared to "0". The timekeeping function begins with 0:00 at once but the time display remains fixed at 88:88, indicating that time correction is required.

All the remaining display segments are disabled and all the keys except the CLOCK Key are not in effect. Upon operation of the CLOCK key the CLOCK mode indicator is energized to initiate the time display operation. Subsequent to this, normal key operations become possible.

(2) clock operation

When the CLOCK mode key is depressed, the display panel LCD is placed into the clock mode and a time to be preset is introduced. After completing the read-in operation, the CLOCK mode indicator blinds. No timekeeping register within the RAM is influenced under the circumstance. When the CLOCK enter key is manually operated, the preset time information is transferred into the timekeeping register to complete the time preset operation so that the indicator goes on indicating without blinking. Although the time preset information is concerned at most with hours and minutes, the timekeeping operation starts with 0 seconds as soon as the CLOCK enter key is operated. A colon (:) on the display blinks only during the time display mode. Another alternative to preset time is to employ the CLOCK ADJUST key. If N hours M minutes are displayed during the time display mode, then depression of the CLOCK ADJUST key will set up the following conditions:

if $0 \leq M < 40$, N hours 0 minutes (0 seconds)
if $M \geq 40$, N+1 hours 0 minutes (0 seconds)

Either the 12 hour period or the 24 hour period is available according to the 12H/24H key during the timekeeping operation. In the case where the time system is changed by the 12H/24H key, all the registers associated with the horological operations are placed in conformity with a newly selected hour period system. The 12H/24H key and the CLOCK ADJUST key are disposed on the same plane as the operational panel not to facilitate manual depression thereof. In the event that an unreasonable value (for example, 51 hours 23 minutes) is introduced and the CLOCK enter key is operated during the time preset operation, this will be construed as an invalid operation.

(3) timer operation

The timer start (or stop) mode key places the display into the timer mode when depressed, allowing time information to be introduced. The timer mode indicator blinks after completing the introduction of the timer information. The timer start register (or the stop register) is not influenced at that time. Upon the subsequent depression of the enter key, the thus introduced timer information is shifted into the timer start register (or the timer stop register). The timer operation starts (or stops) immediately after the end of the time set operation, preventing the indicator from blinking (but remains energized). The time information introduced is stored upon depression of the enter key, energizing the timer start (or stop) memory indicator. When it is not necessarily necessary to set the time information again, all that is necessary to load the memory is to operate the enter key. If the preset time information is in agreement with the time information in the timekeeping clock, the memory is reset and the memory indicator. However, the internal timer start register (or the stop register) is not influenced. It is further noted that the timer start register will not vary even if it agrees with the time information on the clock under the power switch on state. When the timer operation is desired to be interrupted on the way, the operator has only to manually operate the reset key to reset the memory. As noted readily, the timer operation develops timer control outputs necessary to turn on and off the power supply to the AC plug socket and the tape deck apparatus and mechanism control outputs useful to control the tape drive mechanism upon the arrival of the preset time.

The timer start operation makes it possible to offer a morning call and enable absent-home recording because it can turn on and off the AC plug socket and the deck body power at any time. Further, the timer stop operation is useful as a sleep timer. A two-circuit timer is available and a combinations of the timer start operation and the timer stop operation enables to turn on or off the AC plug socket and the deck power supply only for a limited period of time. The timer in the given example covers the 24 hour period and is therefore presetable at any specific point in time within the 24 hour period of the time information in the timekeeping register when the operator is about to set a desired time.

(4) tape counter operation

The tape counter operation is executed in such a way that the revolution detector circuit 9 provides the tape count pulses in synchronization with the revolution velocity of the reel 7 for the $\alpha$ input terminal of the microprocessor and the tape count register TC counts the number of these pulses through an appropriate frequency division thereby to learn the tape position. The count pulses are a train of serial pulses. If the tape runs in the forward direction or the reverse direction, the tape count register TC is incremented during the forward direction mode and decremented during the reverse direction mode. To specify whether the tape counter TC is incremented or decremented, electric representations of the operational state of the drive mechanism are supplied to the control unit. The tape counter ranges from "0" to "999". Depression of the tape counter mode key places the display in the tape counter mode, where any count can be entered. After the entry of the any desired count, the tape counter mode indicator starts blinking. The internal tape count register has not been affected so far. Subsequently, once the enter key has been operated, the entered count is transferred into the tape counter register. This terminates loading of the desired count and the indicator stops blinking while being energized.

Another way to load any desired count into the tape counter TC is to start the tape counter operation with "0". In this instance, the RESET key is depressed so that the tape counter register is reset to "000" and the tape count display is "0". The tape counter also provides the memory rewind output not only to display the tape position but also to control the tape deck apparatus. The "memory rewind" operation generates a memory rewind output and controls the drive mechanism when the tape is running in the reverse direction. The tape counter register is decremented from "1" to "0" in response to the count pulse inputs.

(5) tape counter memory operation

The tape counter memory (TCM) operation is executed so as to produce the drive mechanism if the count value of the tape counter and the tape position preset at the tape count memory register agree. The display is placed into the TCM mode upon the TCM mode key depressed and a desired value for the TCM operation is entered. The entry of the desired value causes the TCM mode indicator to blink. At this time the internal tape count memory register is not affected. Thereafter, when the enter key is depressed, the entered value is transmitted into the tape count memory register, initiating the TCM operation. After completing the loading of the desired value into the tape counter, the indicator stops blinking. Simultaneously, the value is stored and the TCM memory indicator is energized. If there is no necessity for modifying the value for the TCM operation, all that is necessary to execute the TCM operation is to manually operate the enter key. If the value loaded into the memory TCM and the value of the running tape counter agree, then there are provided the drive mechanism control outputs. Once the operation has been completed, M is reset. It will be appreciated that it is possible to set M after the entry TC=TCM. If it is desired to discontinue the TCM operation, upon depression of the RESET key, the memory is reset and the memory indicator is disenergized with no effects on the internal tape count memory register. Another alternative to load a value is the TCM DIRECT IN Key. During the TCM display mode that key when depressed allows the contents of the tape counter to be shifted into the tape count memory register, offering capabilities of loading the memory. Although the contents of the tape count register can be transferred into the tape count memory register upon depression of the DIRECT IN key also during the TC display mode, such transportation can not be visually confirmed with ease. However this can be overcome by placing the display into the TCM display mode.

(6) second counter operation

The second counter is a counter in the order of minutes and seconds and accumulates the period of time where the tape deck apparatus is in the constant speed tape running modes (record and play), learning the amount of the tape used in terms of time.

The second counter ranges from 0 (minutes): 00 (seconds) up to 59 (minutes): 59 (seconds) and starts the counting operation when the tape deck conditional input is the PLAY mode. The second counter mode key places the display into the second counter mode and enables the entry of a desired value. After entering the desired value, the second counter indicator starts blinking. The internal second count register has not been modified yet. Upon further depression of the enter key the desired value is transmitted into the second count register, terminating the loading of the desired value. The indicator goes on displaying without blinking.

In many cases, it is desirable to start the second counting operation with 0 (minutes): 00 (seconds). The reset key is depressed during the second counter display mode so that the second counter register is reset to "000" and the second counter display to 0:00 SEC. If an unreasonable value for minutes and seconds is introduced and the ENTER key is operated, this is construed as invalid.

(7) APLD operation

According to the APLD operation, when one of up to 19 programs recorded on the cassette tape is stored in the APLD register and the mechanism conditional input is APLD (PLAY/FF, PLAY/REW), the APLD (the program-to-program silence) count pulses from the tape deck apparatus are supplied to the $\beta$ input terminal and the APLD register is decremented by one for each APLD count pulse. When the APLD register reaches "0", the output is developed to control the drive mechanism to position the start of the specified program in advance. In skipping the APLD operation, the APLD mode key is manually operated so that the APLD indicator blinks and the APLD operation is ready for program selection. Thus, it is possible to set any program of up to the 19th program after or before the specific program being loaded at present. After the entry of a desired program selection, such selected program number has not yet been modified. Thereafter, upon depression of the enter key, the selected program number is transferred into the APLD register. The program selection operation is completed and the APLD indicator and the number display stops blinking.

As another way to perform program selection of the APLD operation, when the mechanical conditional input is APLD, the APLD indicator blinks automatically and program selection is possible without operation of the APLD key. After the program selection number is entered, this number blinks on the display. Upon operation of the enter key the program selection number is transfered into the APLD register. At this time the APLD indicator keeps on blinking. In the event that more than 19 values are entered in the APLD skip program selection (for example, the value in tens unit is two or more), the tens unit value is reset with only the unit value entered. For example, when 1, 3 and 3 are depressed, the display is $\boxed{1} \rightarrow \boxed{13} \rightarrow \boxed{4}$.

(8) tape running display operation

Whether the tape is running is visually confirmed by the indications indicating the running direction and the state of the drive mechanism.

(9) auto-stop operation

The auto-stop operation is executed to control the operational state of the deck apparatus by monitering the mechanism conditional input and the tape count pulses but without operation of the control unit. This operation provides the tape deck control output provided that the mechanical conditional input is PLAY, FAST FORWARD WIND) FF/PLAY, FF/PAUSE, FF/PLAY/PAUSE, or REW/FF/PLAY/PAUSE indicating the tape running state and the tape counter pulse does not vary over two seconds (namely, when the tape has already stopped running because of the tape end, etc., or when the deck power supply is in the off state).

Operation of the deck apparatus embodying the present invention will be further described by reference to flow charts shown in FIGS. 7 to 12.

Figure 7:
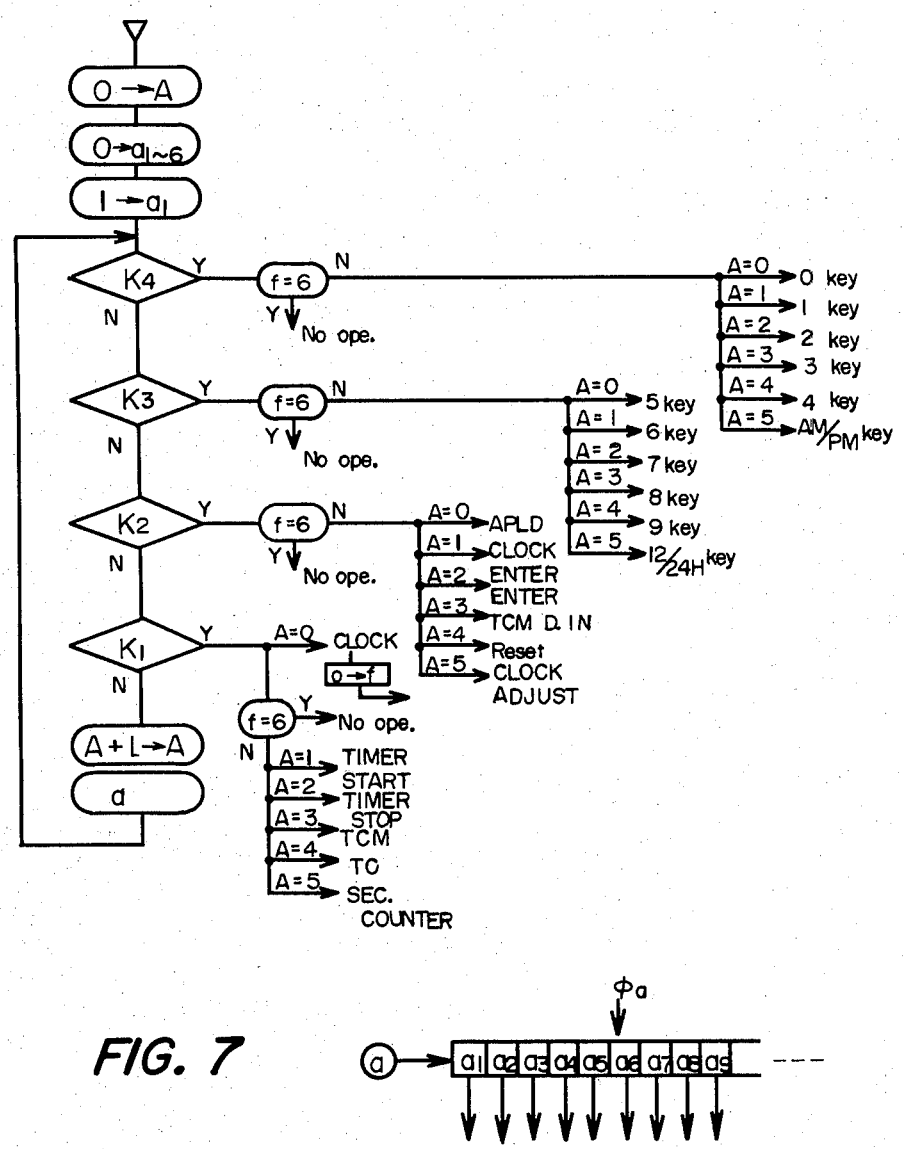
FIG. 7 is a flow chart of a key input routine.

FIG. 7 shows the key input routine.

Figure 8:
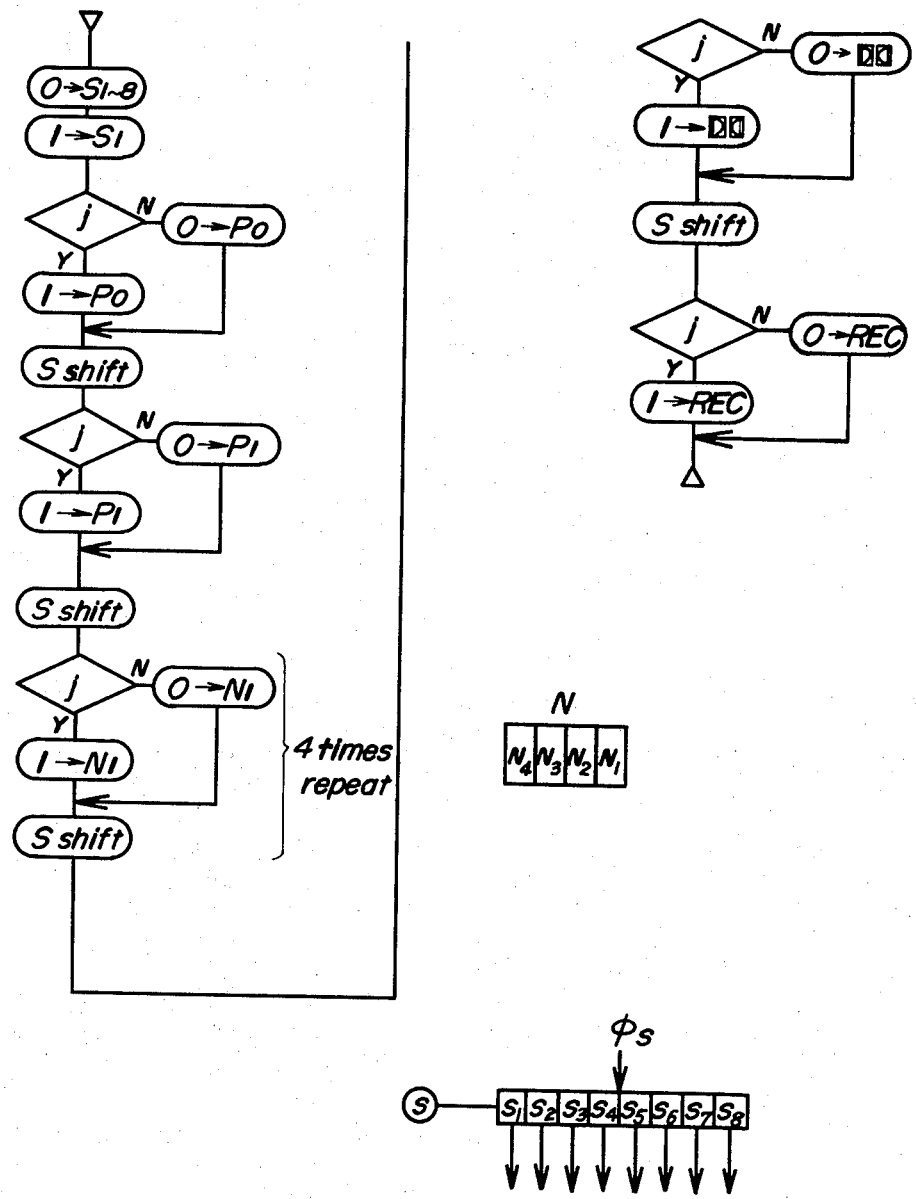
FIG. 8 is a flow chart of a drive mechanism detection routine.
Figure 9:
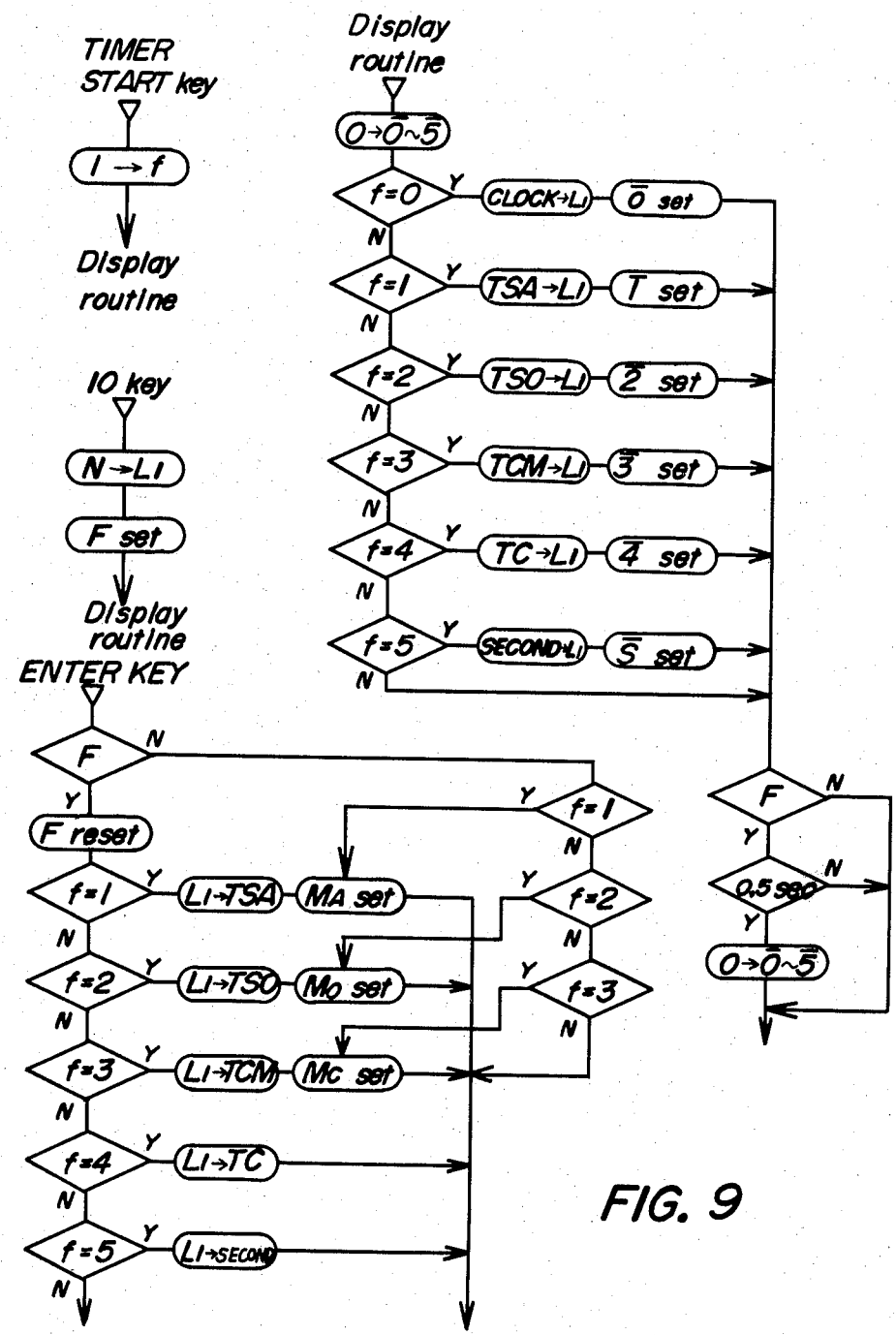
FIG. 9 is a flow chart of a display routine.

FIG. 8 shows the mechanism state detection routine,

FIG. 9 shows the display routine, (1) key detection

The key detection mode is carried out by sequentially scanning the key strobe signals $a_1$-$a_6$ as shown with respect to FIG. 3 and monitering the key inputs $k_1$-$k_4$ from the key matrix 2. FIG. 7 shows the key input routine and a shift register arrangement of $a_1$-$a_6$. The a register is reset, set and shifted in response to the microinstruction ⓐ from the CPU and the clock signal $\phi_a$. In this instance, the accumulator A (within the CPU) and the registers $a_1$-$a_6$ are cleared. Only $a_1$ is set. Under the circumstance, decision is made as to whether there is a key input at $k_1$-$k_4$ and, if no key input is sensed, the accumulator A is added with "1" and the a register is shifted and only $a_2$ is loaded with "1". Otherwise, what key is operated is identified by monitering the contents of the accumulator A. If a key input exists, the inquiry f=6? (f corresponds to the f register of FIG. 5) is executed and the affirmative answer f=6 is concluded as no operation except for the CLOCK key. While f specifies the respective display modes described above, there is no display mode corresponding to f=6. This is because the vale "6" is transferred into f after power throw and all key depressions subsequent to power throw are ocnstrued as invalid except for the CLOCK key. Upon depression of the CLOCK key 0→f is executed and the normal mode is returned. This is to indicate that the power has been thrown and that time is to be set by depression of the CLOCK key.

(2) mechanism state detection routine $S_1$ to $S_8$ are shift registers. The instructions $0 \rightarrow S_1\text{-}S_8$, $1 \rightarrow S_1$ and S shift are executed in response to the microinstruction Ⓢ and the clock signal $\phi_s$ $S_1\text{-}S_8$ are first cleared during the detection routine. Ⓢ =0 and $S_1$ is loaded with 1 at the eight clock pulse $\phi_s$, detecting the mechanism conditional input $\gamma$ at this time. If $\gamma = 1$ (whether the switch 3 corresponding to $S_1$ is operated), $P_0$ is set and if $\gamma = 0$ $P_0$ is reset. $P_0$ stores the operational state of the power switch as shown in FIG. 14. Then, the register S is shifted with $S_2 = 1$. By repeating the above operation the $P_1$ is loaded with the contents of the $\gamma$ input. Similarly, the register N, ▩ ("Dolby" symbol) and REC store the operational state of the drive mechanism. Within the N register $N_1$ is the first bit of N, $N_2$ is the second bit of N, $N_3$ and $N_4$ are the third and fourth bits of N.

(3) data entry

Prior to the data entry mode, the mode key corresponding to the register to be loaded is manually operated to display the contents thereof now contained and energize the associated mode indicator. For example, when it is desired to set the timer start time, the timer start key is depressed so that the program address corresponding to the timer start key is established through the key input routine of FIG. 7. The step 1→f (f: the register) of FIG. 9 is carried out, proceeding with the display routine. Because of f=1 the contents of the timer start time register TSA are shifted into the display buffer register $L_1$ thereby to set T. The timer start time is entered into the $L_1$ register, energizing T which blinks that the entry mode is under process. Then, upon depression of the enter key, the timer start time is transmitted from the $L_1$ register to TSA, completing the loading of the timer start time. The blinking T segment notifies the operator that the TSA register has not been loaded yet. The blinking action is offered by the routine of FIG. 9. When the digit keys are register $L_1$ and the conditional flip flop F shown as one bit of the RAM of FIG. 5 is set. If F=1 is satisfied, the 0.5 second measurement is conducted during the display routine so that the mode indicator segment is disabled every 0.5 seconds to offer the blinding action. In the case where the enter key is depressed while loading the timer start time, $M_A$ is set to enable its associated display segment which indicates that the timer start time has been loaded. This holds true for the timer stop $M_O$ and the tape count memory $M_c$.

(4) data reset

Figure 11:
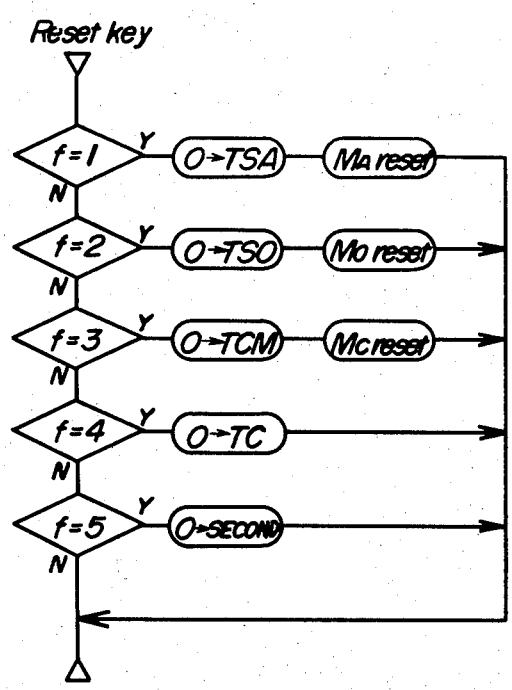
FIG. 11 is a flow chart of a reset key routine.

Date sources are the timer start time TSC, the timer stop time TSO, the tape count memory TCM, the tape counter TC and the second counter SECOND. Those can be cleared by depression of the reset key. The f register decides what data to be cleared. $M_A$, $M_O$ and $M_C$ are also reset concurrently with the clear operation of TSA, TSO and TCM. For example, when it is desired to reset the contents of the SECOND register, the second counter key of FIG. 2 is depressed and the key input routine of FIG. 7 senses the presence of that key, executing 5→f. The indicator SEC is enabled and the contents of SECOND are recalled on the display $L_1$. Upon depression of the reset key, 0→SECOND is executed as shown in FIG. 11, resetting the contents of the SECOND register.

(5) overflow while loading time

Figure 12:
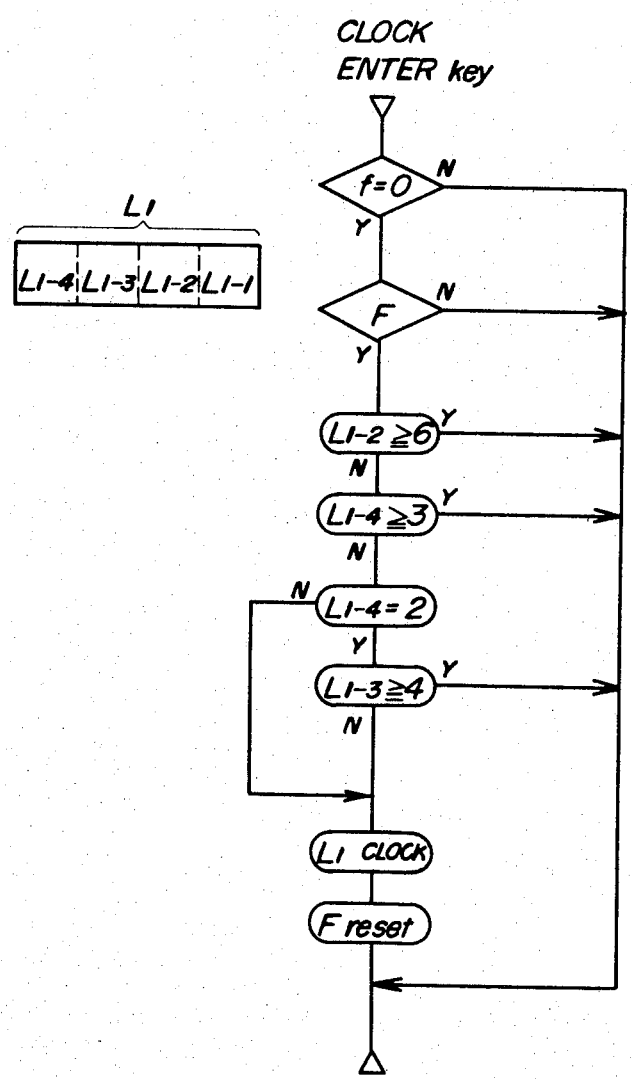
FIG. 12 is a flowchart of a time set routine.

While loading the desired time the time display mode key (CLOCK key) is depressed to permit the display to display the present time. Subsequently, the digit keys are used to enter. While the display mode indicator blinks, the clock enter key is depressed so that the entered time is sent to the CLOCK register. This routine is shown in FIG. 12. If there is error in operation (for example, the entry of 25 hours), the entry never is transferred into the CLOCK register as shown in FIG. 12. The display mode indicator goes on blinking and notifies the operator of an overflow of time data because F is not reset. If correct time is newly entered and the clock enter key is operated, $L_1$→CLOCK and F reset of FIG. 12 are executed.

(6) tape counter

Although the tape counter counts the tape count pulses applied to the $\alpha$ input terminal, whether the tape counter is incremented or decremented is determined by the operational state of the drive mechanism. As seen from FIG. 13, when the tape is running in the forward direction, the counter is incremented when the mechanism state is 2, 5, 6, 7 and 8. When the tape is running in the reverse direction, the counter is decremented when the mechanism state is 9, 10, 11 and 12. The mechanism state is stored within the N register as seen from FIG. 8 and the counting operation is effected by monitering the contents of the N register.

Figure 10:
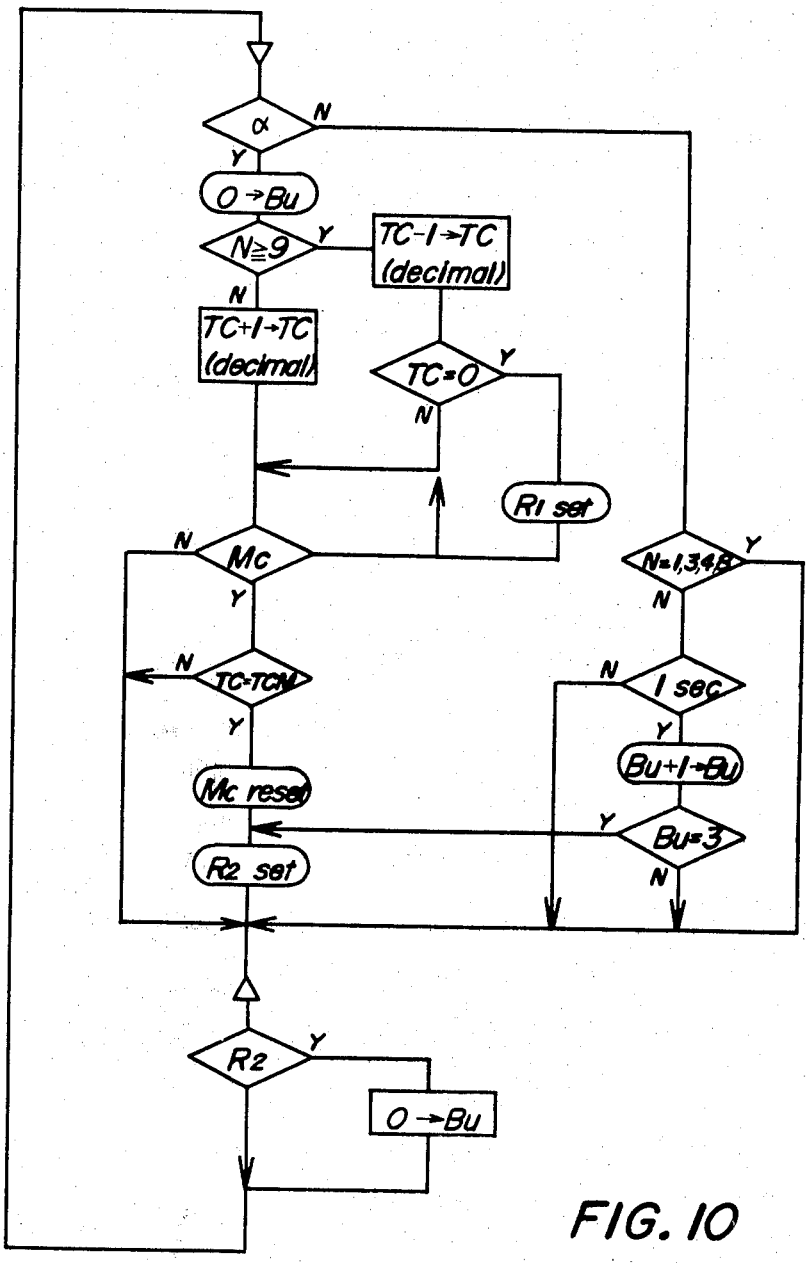
FIG. 10 is a flow chart of a tape count routine.

The tape count routine is shown in FIG. 10. The $\alpha$ input is monitered and, upon the arrival of the tape count pulse, whether the N register stored nine or more is decided. If $N \geq 9$, it is concluded that the tape is running in the reverse direction and the tape counter is decremented. When the tape counter TC reaches "0", $R_1$ is set to provide it output. In other words, the memory REWIND operation is executed. Contrarily, if $N < 9$, the tape is running in the forward direction (N=1, 3, 4 is in the stop state and the tape does not run without the pluses), permitting the tape counter to be incremented. The next succeeding step is the decision as to Mc. If Mc=1, it is decided whether the tape counter TC is in agreement with the tape count memory TCM. If both agree, Mc is reset and $R_2$ is set. In other words, when the preselected tape position is reached, $R_2$ provides the signal to unlock the drive mechanism.

The drive mechanism will remain in the tape running state even after the tape has been wound completely. If nothing is done, problems such as a disordered motor will happen. For this reason, the decision as to N is executed to confirm the mechanism state during the travel of the tape as shown in FIG. 10 when the $\alpha$ input is not viewed. Every one second 1 is added to Bu counter (FIG. 5) Bu=3 implies that the $\alpha$ input is not applied for 3 seconds, setting $R_2$ and generating the pulses to release the drive mechanism. In other words, whether $R_2$ is set is decided. If it is in the set state, the Bu counter is cleared to "0" and returned to the initial state ($\alpha$) while $R_2$ is not set. When Bu$\neq$3, the original state $\alpha$ is reverted.

(7) timer

The timer is loaded with the start time or the stop time via the digit keys. This is operable when the power switch 4 is in the AUTO mode. The time information is entered upon the enter key depressed as clear from FIG. 9 when f=1 or f=2. Depression of only the enter key does not cause variations in data but places $M_A$ or $M_O$ into the set state. Its associated display segment M is enabled. That is, when it is not desired to modify the start time or the stop time, depression of only the enter key makes it possible to set up the timer operation.

The invention being thus described, it will be obvious that the same may be varied in many ways. Such modifications are not to be regarded as a departure from the spirit and scope of the invention, and all such modifications are intended to be included within the scope of the following claims.

We claim:

1. A tape recorder apparatus capable of measuring the instantaneous position of a recorded portion on a tape when operating in one of a plurality of operational modes, said recorder apparatus being capable of rotating said tape at a normal operating speed, comprising:
keyboard means for placing said tape recorder apparatus in one of said plurality of operational modes and for entering data corresponding to the selected operational mode into said tape recorder apparatus, said operational modes comprising a tape counter mode and a seconds counter mode, said tape recorder apparatus measuring the instantaneous position of a recorder portion on the tape by counting the number of revolutions of the tape with respect to an initial starting position when in the tape counter mode and by counting the amount of time elapsed since the commencement of the revolutions of the tape at said normal operating speed when placed in said seconds counter mode via said keyboard means;
running tape counter means for counting the number of revolutions of said tape thereby measuring the instantaneous position of a recorded portion on the tape when said tape recorder apparatus is placed in said tape counter mode via said keyboard means;
memory means responsive to actuation of the keys on the keyboard means for storing preselected position information representative of a desired position of a recorded portion of the tape in response to entry of said preselectable position information into said tape recorder apparatus via said keyboard means, said preselectable position information including digits representative of a preselectable number of revolutions of said tape required to achieve a desired position on tape and digits representative of a preselectable amount of elapsed time since the commencement of the revolution of said tape required to achieve a desired position on tape;
time counter means for counting the amount of elapsed time since the commencement of the revolutions of the tape at said normal operating speed thereby measuring the instantaneous position of said recorded portion on the tape when said tape recorder apparatus is placed in said seconds counter mode; and
decision logic means for determining if the output of the running tape counter means and the output of the memory means agree when in said tape counter mode, said decision logic means determining if the output of said time counter means and the output of said memory means agree when in said seconds counter mode thereby generating a decision logic output signal in response thereto, the output signal of the decision logic means being available to shift the operational state of the tape recorder apparatus.

2. The tape recorder apparatus recited in claim 1 wherein the preselectable position information is introduced via said keyboard means having a plurality of digit keys.

3. The tape recorder apparatus recited in claim 1 wherein the memory means is implemented with non-destructive memory means contained within a microprocessor.

4. The tape recorder apparatus recited in claim 1 further comprising means responsive to actuation of the keys on said keyboard means for establishing any desired count within the running tape counter means.

5. The tape recorder apparatus recited in claim 1 further comprising means for transferring the contents of the running tape counter means into a different memory means.

6. The tape recorder apparatus in accordance with claim 5 wherein said means for transferring the contents of the running tape counter means into a different memory means comprises a direct memory key means on said keyboard means, said direct memory key means transferring the contents of the running tape counter means to said different memory means in response to actuation thereof.

7. The tape recorder apparatus recited in claim 1 further including a program-to-program silence detection means and means for heading a desired program in accordance with said program-to-program silence detection means.

8. The tape recorder apparatus in accordance with claim 1 further comprising a reset key means on said keyboard means for resetting the contents of said running tape counter means and said time counter menas to zero in response to actuation thereof.

9. A tape recorder apparatus capable of measuring the instantaneous position of a recorded portion on a tape, said recorder apparatus capable of rotating said tape at a normal operating speed, comprising:
keyboard means for placing said tape recorder apparatus in a time counter mode and for entering time data into said apparatus corresponding to the time counter mode, said tape recorder apparatus measuring the instantaneous position of a recorded portion on the tape by counting the amount of elapsed time since the commencement of the revolutions of the tape at said normal operating speed when placed in said time counter mode via said keyboard means;
memory means responsive to actuation of the keys on said keyboard means for storing preselectable position information representative of a desired position of a recorded portion on the tape, said preselectable position information including digits representative of the amount of elapsed time since the commencement of the revolutions of said tape required to achieve a desired position on said tape;

time counter means for counting the amount of elapsed time since the commencement of the revolutions of the tape at said normal operating speed thereby measuring the instantaneous position of said recorded portion on said tape; and decision logic means for comparing the output of said memory means with the output of said time counter means and for generating a decision logic output signal when the output of said memory means and the output of said time counter means agree, said decision logic output signal shifting the operational state of said tape recorder apparatus.

10. A control for a magnetic tape sound recording and playing apparatus comprising:

tape drive mechanism means for driving a tape in one of a plurality of predetermined operating states for recording and playing purposes;

detector means coupled to said tape drive mechanism for developing a signal in accordance with the running condition of said tape;

operational board means including manually operable digit keys for introducing a first number and a second number into said apparatus and functional keys for introducing functional commands into said apparatus to control said tape drive mechanism means, said first number representing the time at which said tape is to start or to stop playing or recording, said second number representing the instantaneous position of a recorded portion on the tape at which said tape is to start or to stop playing or recording;

processing unit means including a memory means and a plurality of storage register means, said memory means storing a preselected number of operation programs, said plurality of storage register means storing said first and second numbers introduced via said operational board means and said signal developed from said detector means; and mechanism control means coupled to said processing unit means and responsive to said signal from said detector means for controlling said tape drive mechanism to start or to stop the playing of said tape or the recording on said tape when the elapsed time since the commencement of the running of said tape equals said time represented by said first number stored in said storage register means, said mechanism control means controlling said tape drive mechanism to start or to stop the playing of said tape or the recording on said tape when the instantaneous position of said tape achieved since the commencement of the running of said tape equals said second number stored in said storage register means.

11. A control for a magnetic tape sound recording and playing apparatus comprising:

tape drive mechanism means for driving a tape in any one of or in a combination of a predetermined number of operating states for recording and playing purposes;

tape position detector means coupled to said tape drive mechanism for developing an output signal indicative of the position of said tape being recorded or played;

operational board means having manually operable digit keys for introducing a first number and a second number, said first number representing the time at which said tape is to start or to stop playing or recording, said second number representing the instantaneous position of a recorded portion on said tape at which said tape is to start or to stop playing or recording, said operational board means further comprising functional keys for introducing functional commands for governing said tape drive mechanism means;

processing unit means including memory means for storing a preselected number of operation programs and a plurality of storage register means, said storage register means storing said first and second numbers introduced via said operational board means;

said processor unit means further including timekeeping means for providing a continually updated time of day;

first comparator means for comparing said output signal of said tape position detector means with said second number stored in said storage register means thereby developing a first instruction signal when said output signal and said second number coincide;

second comparator means for comparing the updated time stored in said timekeeping means with said first number stored in said storage register means thereby developing a second instruction signal when the updated time and said first number coincide; and mechanism control means coupled to said processing unit and responsive to said first instruction signal and said second instruction signal for controlling said tape drive mechanism to start or to stop the playing or recording of said tape when said first instruction signal or said second instruction signal is developed.

12. A control for a magnetic tape sound recording and playing apparatus comprising:

tape drive mechanism for driving a tape in any one of or in a combination of a predetermined number of operating states for recording and playing purposes;

tape silence detector means coupled to said tape drive mechanism for developing an output signal when a silent portion on said tape is detected;

operational board means having manually operable digit keys for introducing a first number and a second number, said first number representing the instantaneous position of a recorded position on said tape at which said tape is to start playing or recording, said second number representing the time at which said tape is to start or to stop playing or recording, said operational board means further comprising functional keys for introducing functional commands for governing said tape drive mechanism means;

processing unit means including, memory means for storing a preselected number of operation programs therein, and a plurality of storage register means for storing said first and said second numbers therein introduced via said operational board means; said processing unit means further comprising time-keeping means for providing an updated time of day;

first comparator means coupled to said tape silence detector means for comparing said output signal of said detector means with said first number and developing a first instruction signal when said output signal and said first number coincide;

second comparator means for comparing said updated time of day stored in said timekeeping means with said second number and developing a second instruction signal when said updated time of day and said second number coincide; and mechanism control means coupled to said processing unit means and responsive to said first instruction signal and said second instruction signal for controlling said tape drive mechanism to start or to stop the playing of said tape or the recording on said tape when said first instruction signal or said second instruction signal is developed.

13. A control for a magnetic tape sound recording and playing apparatus comprising:

tape drive mechanism means for driving a tape in any one of or in a combination of a predetermined number of operating states for recording and playing purposes;

tape position detector means associated with said tape drive mechanism for developing an output signal indicative of the instantaneous position of recorded portions on said tape;

operational board means having manually operable digit keys for introducing a first number and a second number into said apparatus, said first number representing the time at which said tape is to start or to stop playing or recording, said second number representing the instantaneous position of a recorded portion on said tape at which said tape is to start or to stop playing or recording, said operational board means further comprising functional keys for introducing functional commands for governing said tape drive mechanism means;

processing unit means including, memory means for storing a preselected number of operation program therein, a plurality of storage register means for storing said first and said second numbers introduced via said operational board means therein, and timekeeping means for providing an updated time;

display means coupled to said processing unit means for displaying said first and second numbers stored in said storage register means and said updated time stored within said timekeeping means;

said processing unit further comprising a first comparator means for comparing said output signal of said detector means with said second number in said storage register means and developing a first instruction signal when said output signal and said second number coincide;

second comparator means for comparing said updated time stored within said timekeeping means with said first number in said register means and developing a second instruction signal when said updated time and said second instruction signal coincide; and mechanism control means coupled to said processing unit means and responsive to said first instruction signal and said second instruction signal for controlling said tape drive mechanism to start or to stop the playing of said tape or the recording on said tape when said first instruction signal or said second instruction signal is developed.

14. A control for a magnetic tape sound recording and playing apparatus comprising:

tape drive mechanism means for driving a tape in any one of or in a combination of a predetermined number of operating states for recording and playing purposes;

tape count detection means associated with said tape drive mechanism means for developing a first output signal indicative of an instantaneous position on said tape represented by the number of revolutions of said tape;

tape silence detector means associated with said tape drive mechanism means for developing a second output signal when a silent portion on said tape is detected;

operational board means having manually operable digit keys for introducing first, second and third numbers, said first number representing the time at which said tape is to start or to stop playing or recording, said second number representing the instantaneous position of said tape measured in revolutions at which said tape is to start or to stop playing or recording and said third number representing a program identifying number at which said tape is to start or to stop playing or recording, said operational board means further comprising functional keys for introducing functional commands for governing said tape drive mechanism means;

processing unit means containing memory means for storing a preselected number of microinstructions therein and a plurality of storage register means for storing said first, second and third numbers introduced via said operational board means;

wherein said processing unit means further comprises, timekeeping means for providing an updated time indication, first comparator means for comparing said first output signal from said tape count detector means with said second number and developing a first instruction upon coincidence therebetween, second comparator means for comparing said second output signal from said tape silence detector means with said second number and developing a second instruction upon coincidence therebetween, third comparator means for comparing said updated time stored within said timekeeping means with said first number and developing a third instruction upon coincidence therebetween; and mechanism control means coupled to said processing unit means and responsive to said first, second and third instructions for controlling said tape drive mechanism to start or to stop the playing of said tape or the recording on said tape when said first instruction, said second instruction, or said third instruction is developed.

15. A control of a magnetic tape sound recording and playing apparatus in accordance with claims 10, 11, 12, 13 or 14 wherein said processing unit means compares the first number stored in said storage register means with the time elapsed since the commencement of the drive of said tape and generates a first signal in response to coincidence therebetween, said processing unit means comparing said second number in said storage register means with an instantaneous position of a recorded portion on said tape measured in revolutions of said tape since commencement of the drive of said tape and generates a second signal response to coincidence therebetween;

wherein said mechanism control means unlocks said tape drive mechanism thereby terminating the driving of said tape when said first signal or said second signal is generated.

16. A control of a magnetic tape sound recording and playing apparatus in accordance with claim 15 wherein said storage registers comprise a tape count memory, said second number being loaded into said tape count memory; and wherein said mechanism control means unlocks said tape drive mechanism thereby terminating the driving of said tape when said instantaneous position of a recorded portion on said tape equals said second number loaded in said tape counter memory.

* * * * *